United States Patent [19]

Sardana

[11] Patent Number: 5,067,148
[45] Date of Patent: Nov. 19, 1991

[54] METHOD AND APPARATUS FOR PLANNING TELEPHONE FACILITIES NETWORKS

[75] Inventor: Sanjeev Sardana, Stamford, Conn.

[73] Assignee: Nynex Corporation, New York, N.Y.

[21] Appl. No.: 627,646

[22] Filed: Dec. 14, 1990

[51] Int. Cl.⁵ .............................................. H04M 7/00
[52] U.S. Cl. .................................... 379/111; 379/137; 379/220; 379/457
[58] Field of Search ............... 379/111, 457, 112, 219, 379/220, 137

[56] References Cited

U.S. PATENT DOCUMENTS 4,790,005 12/1988 Hanselka et al. .................. 379/137
4,984,264 1/1991 Katsube .............................. 379/220

Primary Examiner—Stafford D. Schreyer
Attorney, Agent, or Firm—Douglas J. Kirk; John J. Torrente

[57] ABSTRACT

An acceptable or desired plan for changing the links of a telephone network is developed by using knowledge based rules to generate an ideal plan which meets first constraints, such as demand and modernization constraints, and by modifying the ideal plan to meet one or more second constraints, such as overall cost, while deviating minimally from the ideal plan.

30 Claims, 3 Drawing Sheets

METHOD AND APPARATUS FOR PLANNING TELEPHONE FACILITIES NETWORKS

BACKGROUND OF THE INVENTION

This invention relates to a method and apparatus for planning networks and, in particular, telephone facilities networks.

Telephone facilities networks typically contain a large embedded, physical network (wire, cable, fiber, etc.) whose links (communication paths between nodes or central offices) are required to be changed over time to accommodate changes in demand. In order to meet demand changes in a suitable time frame, the owners of these networks have developed design plans which account for present and anticipated demand and which schedule changes to the network facilities (i.e., the addition or deletion of links) to occur at set times (usually during a specific quarter of a specific year). Furthermore, these plans are continually updated or revised also at specified intervals of time (usually quarterly).

In developing and updating a network facilities design plan, it is important that the plan provide for changes in the physical network to accommodate addition and/or deletion of links in a cost-effective, desirable and predictable way. The design plan must also take into account a myriad of diverse concerns applicable to the system. Thus, demand patterns, technology evolution and changes, economics, market conditions and government regulations are just some of the conditions or constraints which have to be considered.

Use of general methods to develop a design plan for network facilities by attempting to model the constraints involved in the context of an optimization algorithm have not proved entirely successful. These methodologies quickly grow beyond manageable proportions even with simplified models, due to the complexity of the constraints and the large size of the networks. Furthermore, deriving stable solutions with an algorithmic approach becomes even more difficult.

The general methods referred to above are usually classified as weak methods and their inability to effectively develop a plan and updates for telephone facilities networks stems in part from their entirely general nature which divorces their solution strategy from any component of the facilities network domain information. Typical of the weak methods in use today are the following: generate and test; hill climbing; and breadth first and best first search.

The common procedure in these weak methods is to create an arbitrary solution to a problem, determine its goodness, and then either stop or proceed to determine a next solution. By themselves, these methods are ineffectual in determining a solution where the problem involves complex constraints.

Thus, creating an arbitrary solution may in fact be as difficult as finding the desired solution. Furthermore, to establish a measure of goodness for a solution, one needs to have a clearly defined objective function. For the complex problem of telephone network facilities planning, it is hard to determine a computable objective function. If the objective function is qualitative, it is difficult to find an algorithmic solution to optimize it. It also becomes very difficult to find a next or subsequent solution based on the previous solution in a way that ensures successive movement towards the desired solution. Sometimes it is possible to model a highly simplified version of a complex network in such a way as to establish a computable objective function, but even then, the optimization itself remains highly intractable and the solution must be found approximately using numerical methods.

An important aspect of these weak methods is that at any given point in the process, the solution does not represent the desired solution (until the final step). Thus it is imperative that the iterative process continue until an acceptable solution can be found. This implies that it must be possible to know how good a solution is and how to improve it. Further, it frequently implies that a complete optimization type algorithm must be implemented to determine the best solution, since there is no prior information about the desired solution. Accordingly, the weak methods have not been successful in developing solutions to telephone facilities planning.

It is, therefore, an object of the present invention to provide a method and apparatus for developing a plan for the facilities of a telephone network which does not suffer from the above disadvantages of weak methods.

It is a further object of the present invention to provide a method and apparatus for developing a plan for changing the links of a telephone network which is deterministic, predictable and does not require exhaustive optimization.

SUMMARY OF THE INVENTION

In accordance with the principles of the present invention, the above and other objectives are realized in a method and apparatus wherein an acceptable or desired plan for the links of a telephone network is developed starting with rules defining an ideal plan. These rules are based upon domain specific heuristics (knowledge based) and are such that certain predetermined first constraints are satisfied and certain other second constraints may or may not be satisfied. The ideal plan becomes the desired plan if all the constraints, both first and second become satisfied in the first step.

If the second constraints (some or all) are not satisfied, a second step is enacted in which the ideal plan is modified so as to satisfy some or all of the second constraints by permitting deviation from the first constraints. This modification is further carried out in a way which attempts to minimize deviations from the ideal plan. The overall result is a desired or acceptable plan for the telephone links including embedded network changes which is close to ideal and which satisfies the desired constraints.

The aforesaid second step of the invention can be carried out by a simple greedy process, since the goal is to satisfy certain of the second constraints and not to optimize them. Furthermore, the second constraints are simpler, usually numerical and generally few in number. Thus, the process in the second step can be devised to bring the plan closer to acceptable, without exhaustion optimization. Alternatively, the second step can be carried out by changing the thresholds in the rules or the rules themselves so that an acceptable plan which tends to minimize the deviation from the ideal plan again results. Using, either approach, it may be necessary to carry out successive iterations or changes to arrive at a desired plan, i.e., one that satisfies certain of the desired first and second constraints.

In the embodiment of the invention to be disclosed hereinafter, the network has a large embedded, physical structure and the knowledge based heuristics establish rules for an ideal plan which accommodates link changes to meet modernization constraints for the embedded network and demand constraints, but not overall monetary constraint. The plan for the network is then deviated from by relaxing the modernization constraints in a way which tends to deviate minimally from the ideal, but which permits the overall monetary constraint to be realized. The embedded network is thus moved as close as possible to the modernization requirement of the ideal plan in a way to meet demand and overall cost.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
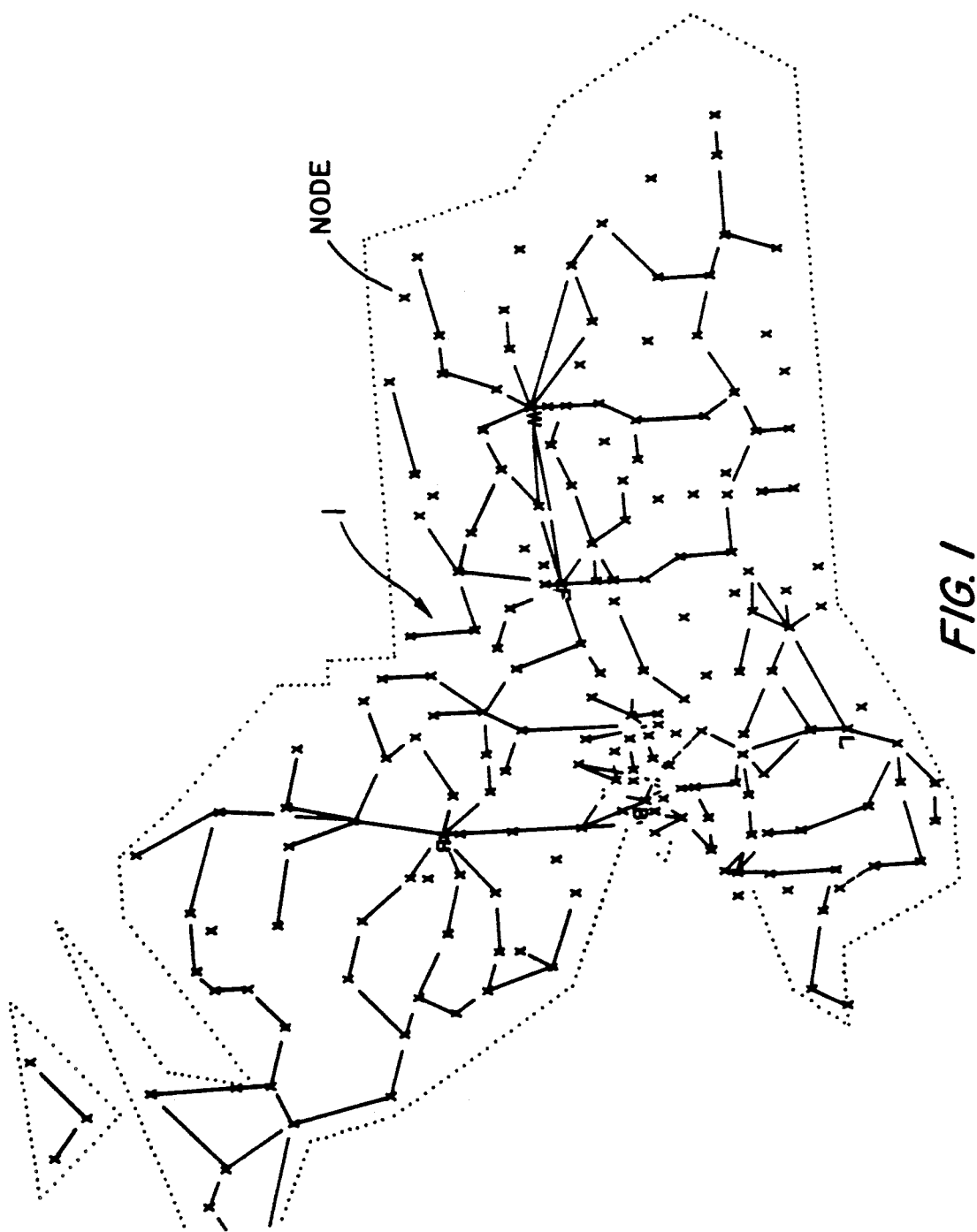
FIG. 1 shows a telephone network comprising a plurality of nodes.

FIG. 1 shows a telephone network 1 comprising a plurality of nodes (typically central offices) between which telephone traffic or communication takes place. The telephone network comprises a large, embedded physical plant (e.g., wire, cable, fiber, etc.) for carrying the telephone traffic over links between the nodes. A link is a communication path between two nodes over which telephone signals can be communicated with modulation/demodulation of the signals occurring only at the two node ends. The physical plant may cause a communication path to be carried through an intermediate node, but as long as there is no modulation/demodulation at the intermediate node, the communication path still defines a single link between the two end nodes.

Figure 2:
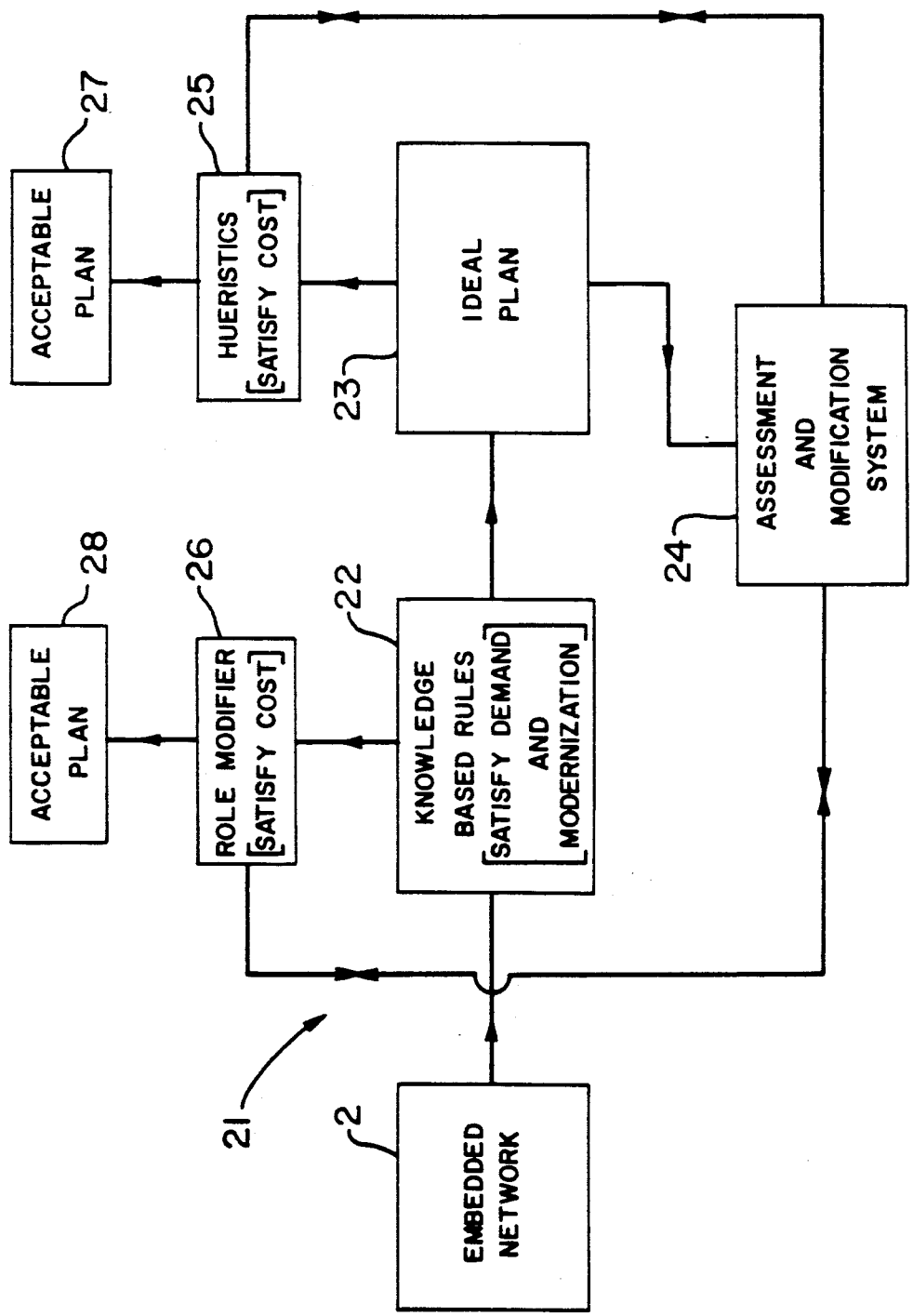
FIG. 2 shows schematically a system for developing a plan for changing the links of the network of FIG. 1.

FIG. 2 shows a system 21 in accordance with the principles of the present invention for developing and periodically updating a desired or acceptable design plan for the links of the network 1. The design plan will usually provide for the addition and/or deletion of links to the network 1 during specified intervals of time (e.g., quarterly) and over a preset period of time (e.g., five years). Updates to the plan will also be developed at specified intervals (e.g., quarterly).

In accord with the invention, the system 21 develops the design plan in one or more steps or stages. In a first stage, an ideal plan 23 for changing the links of the embedded network 1 is generated by a device 22 using domain specific heuristics or knowledge based rules designed to satisfy predetermined first constraints (i.e., in the present case, demand and modernization of the embedded network). If the assessment and modification system 24 determines that the ideal plan also satisfies certain predetermined second constraints (i.e., in the present case, overall cost), the ideal plan will be considered the desired or acceptable plan and the process is complete. If the second constraints are not satisfied, a second stage is enacted in which the system 24 either modifies the ideal plan 23 directly through a device 25 or the knowledge based rules through a device 26 to arrive at an acceptable plan 27 or 28, respectively. In either case, the modifying procedure may require a number of iterations before the desired constraints become satisfied and the acceptable plan is realized.

In carrying out the second stage, the modifications to the ideal plan or the knowledge based rules enacted by the system are relatively small and this guarantees that the domain specific heuristics used in the first stage dominate the plan and growth of the network. The system 21 thus provides an acceptable plan which is stable and can be rationalized on the basis of identifiable constraints and domain heuristics. The plan is thus not based on obscure cost constraints (derived from a variety of factors) interacting in unidentifiable ways.

In using the system 21 to plan for changes in the links of the network 1, the methodology encompasses planning for all the link attributes, including for example routing, technology selection, scheduling, equipment selection and sizing. Also, since the links are arranged in layered fashion based on capacity, a design plan must be established for the links of each layer. However, to simplify illustration of the present invention, the description below confines itself to the planning for the links in the so called DS3 layer in the digital hierarchy. These links carry 45 Mb/s telephone channels.

FIRST STAGE

In the first stage of operation of the system 21, i.e., the stage which develops the ideal plan 23, the device 22 carries out processes which depend upon domain heuristics, i.e., rules based on knowledge of the network. These processes are explained at length below and include the following: demand analysis for the DS3s of the network; routing and deleting of the DS3s as required by the demand analysis; allocation of any newly routed DS3s onto high capacity ("hicap") links and technology selection for each hicap link.

The demand analysis is carried out first. It entails determining the number and the timing for implementing the addition or deletion of DS3s between the nodes of the network 1. The number of DS3s primarily depends upon the utilization pattern (level over time) of the hicap link or links carrying DS3s between the nodes. In general, if a link between two modes is determined to have utilization (total DS3 channel use) above a certain threshold for a period of time exceeding a certain minimum period, the link then can be considered as a candidate for adding of one or more DS3s. The number of DS3s added will, of course, depend upon the extent to which the threshold is exceeded.

Once the demand analysis is completed and the new DS3s to be added between nodes are determined, these DS3s are then routed on one or more hicap links. The specific hicap links used for the new DS3s depend on a variety of factors. In accordance with the invention, these factors are embodied in a routing scheme which employs a combination of thresholds, a static hubbing hierarchy for links between nodes, and simple routing and technology decisions to realize the ideal plan. Each of these steps in the routing scheme is described in further detail below.

Figure 3:
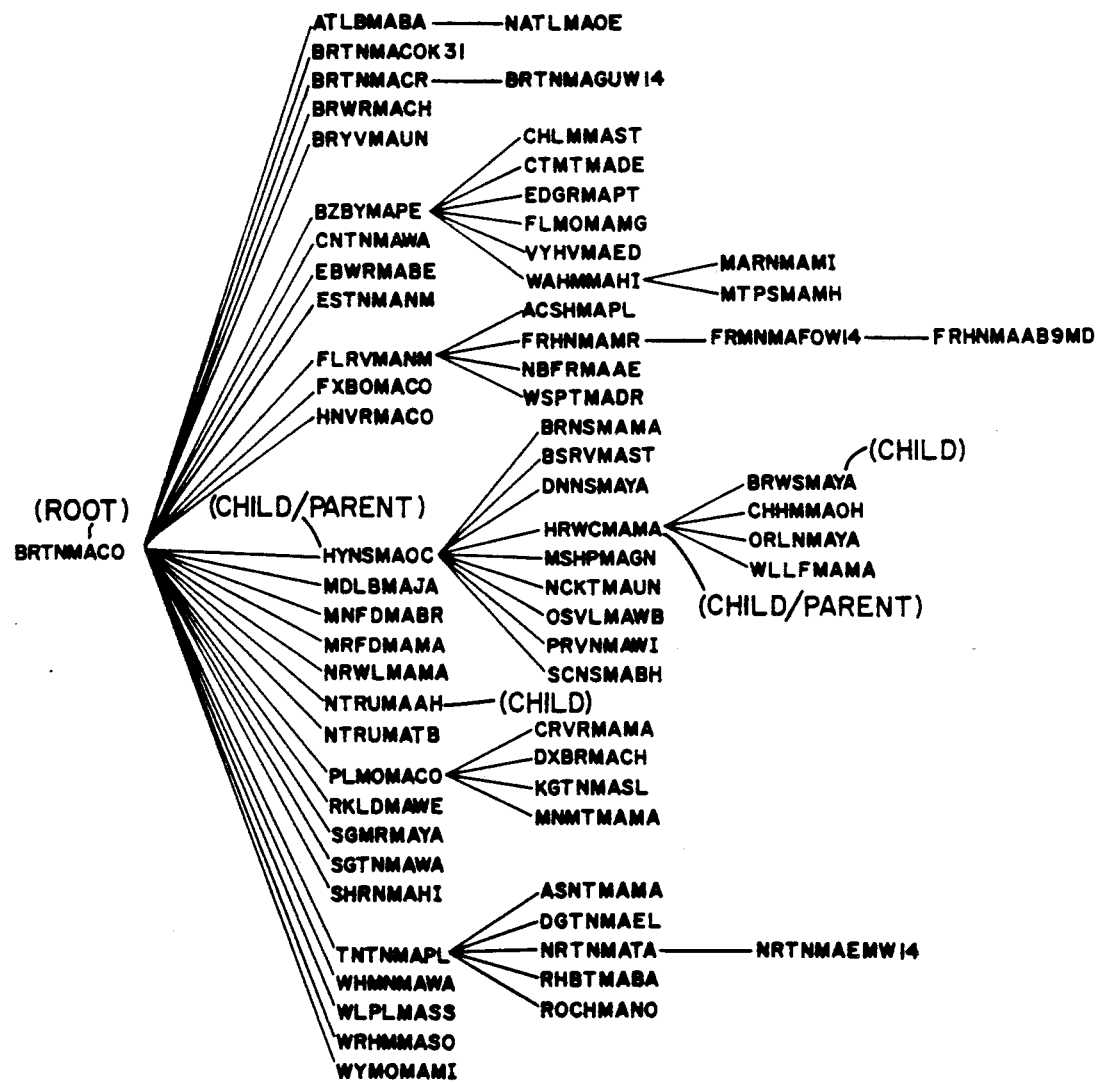
FIG. 3 shows a hub structure for guiding development of the plan by the system of FIG. 2.

To establish the hubbing hierarchy, the nodes of the network are partitioned into a collection of trees. Each tree represents a hierarchy where each child node hubs on its parent. The hubbing parent and child nodes are based on a variety of factors such as geographical locations, demographics, future plans, the existing network, rights of way, etc. and is determined separately using modeling tools and network studies. The hubbing hierarchy is used as an input to and a guide for the routing methodology. The root nodes of the trees are also known as major hubs. No node is duplicated in any tree or across trees. Assuming that a simple direct link exists between each root node, and between each child node and its parent, a path can be found between any two nodes by simply following the parent (hub) links from the two end nodes until they reach their respective roots and then directly linking the roots. This assures that all links are connected and that a path can always be found between any two nodes. A good route must, however, minimize the number of intermediate nodes. FIG. 3 shows a typical tree for one set of nodes of the network 1. As can be seen, the tree follows the hubbing hierarchy set forth above.

The cost of routing the DS3s is extremely complicated and difficult to implement mathematically. Thus, in accordance with the invention, simple heuristics based on thresholds are used. More particularly, when the total DS3 demand between a pair of nodes crosses a certain level (threshold), a route based on a single (direct) hicap link between the two nodes is considered desirable. When the total DS3 demand is less than this threshold, a route via multiple links must be found. This is accomplished by using the hubbing scheme to route the DS3s via the immediate hubs (of the two ends nodes) and then establishing the routing between the hubs based on their total DS3 demand. Since eventually a route can always be found by following the hub links, it is guaranteed that this process will stop with a valid route. Further details of the routing process are described hereinbelow.

Once the DS3 routing is completed, the DS3s are allocated to appropriate hicap links to accommodate the routing. At this point, the allocation process is completed and the choice of hicap technologies to be used to augment various hicap links whose allocated DS3 demand exceeds link capacity at various points in time is carried out using a greedy bin packing algorithm. In particular, the DS3 demand on each link is analyzed and when the fill on a link exceeds a desired maximum, the capacity is augmented with a further hicap link using a technology referred to as the ideal technology. The ideal technology is based on the demand pattern and the expected total demand. Once the additional hicap links and hicap technology for the links have been selected to satisfy DS3 demand, the first stage of processing by the system 21 ends and the ideal plan is completed.

This plan is considered ideal because it provides the right balance of present and future costs as encapsulated in the thresholds and because the routing is based on the desired hubbing scheme. It is also ideal because it satisfies demand while also providing for growth of the hicap links (i.e., modernization of the network 1) along well established and desired paths. This predictability of growth is desirable because it provides stability to the network. A planner can thus look ahead three to five years with some certainty about the state of the network which is also desirable because many planning decisions have a long term impact.

For example, if a shortage of fiber in the network 1 is seen and a decision to augment fiber is made, it is common to make this planning decision about two years in advance. Thus, an unstable plan would be highly undesirable due to previous commitments.

It should be noted also that, in the present example, the routing is done hierarchically and hubbing architecture is employed for routing because these are considered preferable in the present environment. Were the environment to change substantially, the hubbing architecture may change, for example, possibly to a ring architecture. Thus, while some architecture for guiding the routing is desirable, it will be dictated by the character of the network involved.

The ideal plan for the links for DS3s developed in the first stage is based on the rules for the device 22 which satisfy certain constraints (i.e., demand and modernization, in the present example), but in doing so it may not also satisfy certain other constraints (i.e., overall cost, in the present example). Thus, no overall cost constraint is applied by the device 22 in developing the ideal plan.

Accordingly, after the first stage is completed, an assessment device 24 of the system 21 then assesses whether the ideal plan also satisfies the overall cost constraint. If the constraint is satisfied, the ideal plan is the desired or acceptable plan and the system 21 has completed the plan process. If not, the ideal plan must be altered by modifying the rules of the system 22 in the device 26 or by applying further heuristics and/or algorithms in the device 25 to realize an acceptable plan which, in each case, deviates from the ideal plan so as to tend to minimize any differences.

In present example, overall cost is the only constraint to be satisfied in the second stage. This does not, however, preclude other constraints from being satisfied in this stage. For example, policies may dictate the need to avoid routes longer than five links (for network quality reasons). The rules in the first stage for the ideal plan may thus not have the length of links as a constraint. Such a constraint can then also be attended to in the second stage with the overall cost constraint.

SECOND STAGE

In the present example, the device 25, also using knowledge based rules or heuristics, modifies the ideal plan to realize the overall cost constraint in an iterative. Since each interaction causes more and more deviation from the ideal plan, meeting the cost constraint must be accomplished in the least number of steps, and stopped as soon as it can be determined that the constraint is met or that it cannot be met. This process is accomplished by first using some simple heuristics to determine the candidate hicap links to be added in the ideal plan which can potentially be avoided. The DS3s slated for routing over each of these links can then become candidates for re-routing. If they can all be re-routed in a more cost effective way without degrading the routing beyond acceptable levels, then such hicap links can be canceled from the ideal plan. If only the initial DS3s can be re-routed, then the hicap link can be postponed, partially accomplishing the desired effect. This process is continued until the overall cost is sufficiently reduced or no more candidate hicap links remain. In the later case, the overall cost constraint must be increased, some other constraints must be relaxed, or DS3s must be canceled; the decision is left to the planner. More detailed steps of the second stage are described below.

Since the primary objective of the second stage in the present case is to reduce the overall cost, a greedy method can be used to isolate the hicap links to be avoided. The hicap links with most cost and least fill are first identified and prioritized. Only those links with fill below an economic level are considered candidates for cancellation or postponement. Thus, an attempt to re-route the DS3s on most costly (low filled) hicap systems is made first. While this method does not guarantee least deviation from the ideal plan, it provides an acceptable plan.

One important element of the re-routing process is that the hicap topology may only be reduced, not expanded. This implies, that during re-routing, only those routes will be selected which have available spare capacity. Re-routing is thus accomplished with a least cost routing algorithm using the spare capacity, hicap topology, original routing cost, and original route information.

The original route and its cost provide the bounding conditions to prevent a new route from being too costly or too inferior in quality. When a new route is established, the routing for the DS3s is modified and capacities on hicap links are adjusted. Finally, the overall cost reduction constraint is recomputed and the next candidate hicap link is analyzed. This process is continued until the cost constraint is achieved or no more candidates exist. In the latter case, one option is to raise the maximum fill level for identifying candidates for re-routing. Another option might be to allow greater degradation in route quality when re-routing. If these are unacceptable options, then some DS3s may be canceled by re-routing lower capacity systems, or the overall cost constraint may be raised.

The above procedure exemplifies the operation of the of the device 25 in modifying the ideal plan to meet overall cost constraints and provide the acceptable plan 27. The second stage can also be carried out via the device 26 which modifies the rules (either one or more rules entirely and/or the thresholds or other requirements in one or more rules) of the device 22 to realize the acceptable plan 28. Thus, for example, the device 26 may relax (increase) the thresholds for determining the number of DS3s required for deciding that a direct link between nodes is needed, thereby reducing the number of new hicap links required. This will reduce overall costs and by iterating the degree of relaxation, the overall cost modified to meet the overall cost constraint.

Both of the above procedures in the second stage have the effect of relaxing the modernization constraint of the ideal plan placed on the network 1 by the original rules of the device 22. However, the processing of system 21 acts to meet the demand and cost constraints, while moving the embedded network 1 toward the ideal plan which encompasses the desired modernization constraints.

As above-indicated, in the present illustrative case, a routing process for the DS3s is carried out in the first stage of operation via the device 22. The details of the routing process can be summarized in the following steps:

1. Sort all links in non-decreasing Order and analyze them in that sequence. The Rank of a node is defined to be depth of the node from its root, thus root nodes have a rank of 0. The order of a DS3 link (cross-section) Order (A,Z) is given as: Order $(A,Z) = Max(Rank(A), Rank(Z)) + .0.01 * ABS [MAX(RANK(A), RANK(Z)) - MIN(RANK(A), RANK(Z) -1]$ 2. If the route of the link can be established (i.e., completely determined), then mark the link as solved. The routing of any link can be established under one of the following four conditions:
   a.) The peak demand (#of DS3s embedded +- growth) is such that a conterminus (single link, direct design) hicap design is desired. The governing rules are:
      Demand>4 (A distance independent high bit rate system is justified.)
      Demand< =4
      If a DDM (90 Mbs or 180 Mbs hicap system) is desired and can be built.
      A DDM is desirable (when needed) in rural and suburban areas but not in metro areas. DDMs are not built in Metro-Metro & Metro-Suburban areas. From engineering standpoint, DDMs are built where they can be routed over single mode fiber without needing any repeaters. The distance, one can go without needing a repeater depends on the area and currently defaults to 18, 15, and 12 miles for rural, suburban, and metro areas respectively. An average is taken for mixed area pairs.
   b) The link A, Z is such that either $A = Z_{hub}$ or $Z = A_{hub}$. In this case a conterminus hicap design is desired irrespective of the demand.
   c) Both A and Z are root nodes. In this case too conterminus design is desired irrespective of the demand level.
   d) A conterminus hicap link already exists.

In all four cases the routing is established since it trivially reduces to a single link consisting of the two end points A and Z.

3. If the route cannot be determined directly then the route is defined as:
   If $Rank(A) > = Rank(Z)$
   then $Route(A, Z) = Route(A, A_{hub}) + Route(A_{hub}, Z)$
   else $Route(A, Z) = Route(A, Z_{hub}) + Route(Z_{hub}, Z)$.

Add the two new links into the original sequence according to their Order.
   Remove this link from the sequence and mark it as solved.
   Select the next link (if any left) and proceed to step 2.

4. Sort all links in non-decreasing Order and re-analyze them in that sequence. Wherever a route via intermediate nodes has been identified, the route is analyzed to identify if a shorter route exists due to existing hicap links which could not be considered because of the algorithm. This will happen when high usage links exist across nodes with ranks differing by more than one. To accomplish the goal of routing via minimum links along the ideal path (the ideal path must pass through nodes in the direct ancestry of the two ends), alternate routing is determined based on minimum links along the ideal path. If the alternate route is shorter than that established in the steps above, then it is preferred over the initial one.

It should be noted that the devices 22 and 24-26 can be implemented via a computer program or programs, which incorporate the knowledge based rules, heuristics and other functions discussed above.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What Is claimed

1. A method for developing an acceptable plan for changing the links serving the nodes of a telephone network comprising the steps of:

developing an ideal plan for changing the links using knowledge based rules adapted to satisfy one or more first constraints;

assessing whether the ideal plan satisfies one or more second constraints and if so identifying the ideal plan as the acceptable plan;

and if the ideal plan fails to satisfy said one or more second constraints, modifying the ideal plan to satisfy at least one of said first constraints and one or more of said second constraints to realize said acceptable plan.

2. A method in accordance with claim 1 wherein:
said one or more first constraints include demand on said links and modernization of said links;
said at least one constraint is said demand constraint; and said one or more second constraints include the overall cost of the changes to said links.

3. A method in accordance with claim 2 wherein:
said step of modifying said ideal plan is carried out in a way which substantiality deviates minimally from said ideal plan.

4. A method in accordance with claim 1 wherein:
said step of modifying includes using further knowledge based rules to change said ideal plan.

5. A method in accordance with claim 1 wherein:
said step of modifying includes changing one or more of said knowledge based rules to change said ideal plan.

6. A method in accordance with claim 5 wherein:
changing said one or more knowledge based rules includes changing a threshold in one or more of said knowledge based rules.

7. A method in accordance with claim 1 wherein:
said step of developing an ideal plan includes: analyzing the channel demand between nodes of said network; determining the routing for increased channel demand; allocating the routed increased demand to existing links and/or links to be added; and selecting the type of technology for the added links.

8. A method in accordance with claim 7 wherein:
said channel demand is DS3 channel demand;
and said links are hicap links.

9. A method in accordance with claim 7 wherein:
said modifying of said plan includes rerouting channel demand from links having high cost and low utilization.

10. A method in accordance with claim 9 wherein:
said high cost links use fiber technology.

11. A method in accordance with claim 7 wherein:
the step of analyzing the channel demand includes determining that a channel has to be added when the utilization level over time of the channels of the link or links between two nodes exceeds a preselected threshold over a preselected period of time.

12. A method in accordance in accordance with claim 11 wherein:
said step of determining the routing for increased channel demand includes: establishing a hubbing hierarchy for said modes wherein said nodes are arranged in one or more trees, each tree having a root node and parent/child nodes, each parent child/node of a tree hubbing from only one other node of the tree and capable of having one or more other parent/child nodes hubbing from it; and formulating the routing by examining the channel demand for node pairs on a tree further from the root node first.

13. A method in accordance with claim 12 wherein:
said step of determining includes: accounting for the increased demand between all node pairs of a tree in determining the routing.

14. A method in accordance with claim 13 wherein:
said method of routing the increased demand includes for the nodes of each tree: (a) sorting node pairs into an order based on node pairs having a node further from the root node being placed in the order before node pairs have a node closer to the root node; (b) analyzing the node pairs in the sequence of the order for routing of increased channel demand; (c) if the node pair being analyzed has increased channel demand exceeding a given threshold or the nodes are related as parent and child or both are root nodes or the nodes are connected by a link of predetermined capacity, identifying the route as requiring a direct link between the node pairs and identifying the routing of the increased channel demand as solved, and, if not, deleting the node pair from the order and adding two additional node pairs to the order having the increased demand of the node pairs being deleted, where one of the added node pairs contains the node being deleted which is furthest from the root node and the parent node of said furthest node and the other added node pair contains said parent node and the other node being deleted, and returning to (b).

15. A method in accordance with claim 14 further comprising:
further analyzing said determined routing to determine alternating routing based on minimizing the links connecting node pairs.

16. Apparatus for developing an acceptable plan for changing the links serving the nodes of a telephone network comprising:
means for developing an ideal plan for changing the links using knowledge based rules adapted to satisfy one or more first constraints;
means for assessing whether the ideal plan satisfies one or more second constraints and if so identifying the ideal plan as the acceptable plan;
and means responsive to said assessing means, for modifying the ideal plan to satisfy at least one of said first constraints and one or more of said second constraints to realize said acceptable plan, if the ideal plan fails to satisfy said one or more second constraints.

17. Apparatus in accordance with claim 16 wherein:
said one or more first constraints include demand on said links and modernization of said links;
said at least one constraint is said demand constraint; and said one or more second constraints include the overall cost of the changes to said links.

18. Apparatus in accordance with claim 17 wherein:
said modifying means modifies said ideal plan in a way which substantiality deviates minimally from said ideal plan.

19. Apparatus in accordance with claim 16 wherein:
said modifying means uses further knowledge based rules in modifying said ideal plan.

20. Apparatus in accordance with claim 16 wherein:
said modifying means changes one or more of said knowledge based rules to modify said ideal plan.

21. Apparatus in accordance with claim 20 wherein:

said modifying means changes said one or more knowledge based rules by changing a threshold in one or more of said knowledge based rules.

22. Apparatus in accordance with claim 16 wherein:
said means for developing an ideal plan includes: means for analyzing the channel demand between nodes of said network; means for determining the routing for increased channel demand; means for allocating the routed increased demand to existing links and/or links to be added; and means for selecting the type of technology for the added links.

23. Apparatus in accordance with claim 22 wherein:
said channel demand is DS3 channel demand;
and said links are hicap links.

24. Apparatus in accordance with claim 22 wherein:
said means for modifying said ideal plan includes means for rerouting channel demand from links have high cost and low utilization.

25. Apparatus in accordance with claim 24 wherein:
said high cost links use fiber technology.

26. Apparatus in accordance with claim 22 wherein:
the said means for analyzing the channel demand includes: means for determining that a channel has to be added when the utilization level over time of the channels of the link or links between two nodes exceeds a preselected threshold over a preselected period of time.

27. An apparatus in accordance in accordance with claim 26 wherein:
said means for determining the routing for increased channel demand includes: means for establishing a hubbing hierarchy for said modes wherein said nodes are arranged in one or more trees, each tree having a root node and parent/child nodes, each parent child/node of a tree hubbing from only one other node of the tree and capable of having one or more other parent/child nodes hubbing from it; and means for formulating the routing by examining the channel demand for node pairs on a tree further from the root node first.

28. Apparatus in accordance with claim 27 wherein:
said means for determining further includes: means for accounting for the increased demand between all node pairs of a tree in determining the routing.

29. Apparatus in accordance with claim 28 wherein:
said means for routing the increased demand functions for the nodes of each tree to: (a) sort node pairs into an order based on node pairs having a node further from the root node being placed in the order before node pairs have a node closer to the root node; (b) analyze the node pairs in the sequence of the order for routing of increased channel demand; (c) if the node pair being analyzed has increased channel demand exceeding a given threshold or the nodes are related as parent and child or both are root nodes or the nodes are connected by a link of predetermined capacity, identify the route as requiring a direct link between the node pairs and identify the routing of the increased channel demand as solved, and, if not, delete the node pair from the order and add additional node pairs to the order having the increased demand of the node pairs being deleted, where one of the added node pairs contains the node being deleted which is furthest from the root node and the parent node of said furthest node and the other added node pair contains said parent node and the other node being deleted, and return to (b).

30. An apparatus in accordance with claim 29 further comprising:
means for further analyzing said determined routing to determine alternate routing based on minimizing the links connecting node pairs.

* * * * *

UNITED STATES PATENT AND TRADEMARK OFFICE
CERTIFICATE OF CORRECTION

PATENT NO. : 5,067,148
DATED : November 19, 1991
INVENTOR(S) : Sanjeev Sardana It is certified that error appears in the above-identified patent and that said Letters Patent is hereby corrected as shown below:

Col. 2, line 61.  After "Using" delete -- , --
Col. 5, line 23.  Change "ends" to -- end --
Col. 6, line 22.  After "In" insert -- the --
Col. 6, line 53.  Change "later" to -- latter --
Col. 7, line 64.  Change "conterminus" to -- counterminus --
Col. 8, line 10.  After "tance" delete ","
Col. 9, line 20, change "substantiality" to --substantially--
Col. 10, line 60, change "substantiality" to --substantially--
Col. 11, line 18.  Change "have" to -- having --
Col. 11, line 28.  Delete "in accordance" second occurrence
Col. 11, line 32.  Change "modes" to -- nodes --
Col. 12, line 13.  Change "have" to -- having --

Signed and Sealed this

Thirtieth Day of March, 1993

*Attest:*

STEPHEN G. KUNIN

*Attesting Officer*   Acting Commissioner of Patents and Trademarks